(12) United States Patent
Ichikawa

(10) Patent No.: US 8,929,185 B2
(45) Date of Patent: Jan. 6, 2015

(54) OPTICAL DISC RECORDING DEVICE AND OPTICAL DISC RECORDING METHOD

(75) Inventor: Kazuhiro Ichikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 51 days.

(21) Appl. No.: 13/437,203

(22) Filed: Apr. 2, 2012

(65) Prior Publication Data

US 2012/0294132 A1 Nov. 22, 2012

(30) Foreign Application Priority Data

May 20, 2011 (JP) .................................. 2011-113936

(51) Int. Cl.
G11B 5/09 (2006.01)
G11B 7/00 (2006.01)
G11B 7/006 (2006.01)

(52) U.S. Cl.
CPC .................................... *G11B 7/0062* (2013.01)
USPC .... 369/47.5; 369/59.11; 369/116; 369/13.26; 369/47.51

(58) Field of Classification Search
None
See application file for complete search history.

(56) References Cited

U.S. PATENT DOCUMENTS

| | | | |
|---|---|---|---|
| 5,396,480 A * | 3/1995 | Morishita et al. | 369/116 |
| 6,504,806 B1 * | 1/2003 | Nakajo | 369/59.12 |
| 8,203,923 B2 * | 6/2012 | Shoji et al. | 369/59.11 |
| 2001/0026517 A1 | 10/2001 | Tsukihashi et al. | |
| 2003/0090973 A1 | 5/2003 | Ishitobi et al. | |
| 2004/0233826 A1 | 11/2004 | Sugano | |
| 2005/0265165 A1 * | 12/2005 | Kitagaki et al. | 369/47.5 |
| 2006/0007823 A1 * | 1/2006 | Ishitobi et al. | 369/47.51 |
| 2006/0239166 A1 * | 10/2006 | Yu | 369/59.11 |
| 2008/0310270 A1 * | 12/2008 | Miyamoto et al. | 369/47.53 |
| 2009/0245042 A1 | 10/2009 | Shimakawa | |

FOREIGN PATENT DOCUMENTS

| | | |
|---|---|---|
| JP | 2001-283439 A | 10/2001 |
| JP | 2003-151134 A | 5/2003 |
| JP | 2004-199839 | 7/2004 |
| JP | 2004-326841 | 11/2004 |
| JP | 2004-342271 | 12/2004 |
| JP | 2009-087399 | 4/2009 |
| JP | 2009-245487 | 10/2009 |

OTHER PUBLICATIONS

Japanese Office Action dated Apr. 16, 2013, for International application No. 2011-113936.

* cited by examiner

*Primary Examiner* — Wayne Young
*Assistant Examiner* — Dionne Pendleton
(74) *Attorney, Agent, or Firm* — Morgan, Lewis & Bockius LLP

(57) ABSTRACT

Provided is an optical disc apparatus and an optical disc recording method, in which it is decided whether or not an optical disc recording medium is one of DVD-RW and DVD+RW when data is recorded in the medium. If it is decided that the medium is one of DVD-RW and DVD+RW, maximum length information is read out from a storage portion. The maximum length information contains a previously set maximum data length of data recorded to the medium by an optical pick-up portion in one recording operation. Data to be recorded is split into split data having a data length of the maximum data length or smaller. Further, an electric power value of a base electric power for controlling the semiconductor laser element to emit a laser beam with a bottom power is reset every recording operation of the split data.

4 Claims, 5 Drawing Sheets

OPTICAL DISC RECORDING DEVICE AND OPTICAL DISC RECORDING METHOD

CROSS-REFERENCE TO RELATED APPLICATIONS

This application claims priority based on Japanese Patent Application No. 2011-113936 filed on May 20, 2011, the contents of which are hereby incorporated by reference.

BACKGROUND OF THE INVENTION

1. Field of the Invention

The present invention relates to an optical disc recording device and an optical disc recording method for recording data in an optical disc storage medium. In particular, the present invention relates to an optical disc recording device and an optical disc recording method for recording data in DVD-RW or DVD+RW.

2. Description of Related Art

The optical disc recording device such as a DVD recorder or a BD recorder records data in an optical disc such as a DVD or a BD using a laser beam emitted from a semiconductor laser element mounted on an optical pick-up. In this optical disc recording device, electric drive power of the laser beam is determined in accordance with a type of the optical disc.

For instance, the electric drive power for recording data in DVD-RW or DVD+RW is constituted of a bottom electric power for driving the semiconductor laser element to emit light with an optical output of bottom power Pb, an erase electric power for driving the semiconductor laser element to emit light with an optical output of erase power Pe, and a peak electric power for driving the semiconductor laser element to emit light with an optical output of peak power Pw. These electric powers are set to predetermined values. In addition, these electric powers are usually controlled by drive current Iop of the semiconductor laser element. FIG. 6 is a graph illustrating optical output characteristic of the semiconductor laser element to the drive current in a conventional example. As illustrated in FIG. 6, the bottom power Pb is controlled by bottom current (current value Iread). In addition, the erase power Pe is controlled by erase current (current value Ie). In addition, the peak power Pw is controlled by peak current (current value Iw).

When data is recorded in DVD-RW or DVD+RW, a current value of a bottom current Iread1 and a current value of an erase current Ie1 are set based on L1 in FIG. 6, for example, before a recording operation is started. Then, based on the current values Iread1 and Ie1, a current value of a peak current Iw1 is set. The current value of the peak current Iw1 is set so that a ratio of a difference between the current value of the erase current Ie1 and the current value of the bottom current Iread1 (Ie1−Iread1) to a difference between the current value of the peak current Iw1 and the current value of the bottom current Iread1 (Iw1−Iread1) becomes a predetermined ratio $\epsilon$ ($\epsilon$>1), as described in JP-A-2009-245487, JP-A-2004-342271, JP-A-2004-326841, JP-A-2009-87399, and JP-A-2004-199839, for example.

The determined current value of the bottom current Iread is not changed until a recording process is finished, but the current value of the erase current Ie1 is feedback controlled so that the erase power Pe does not change during the recording operation. In addition, the current value of the peak current Iw1 is controlled as described above in accordance with the current value of the bottom current Iread1 set before starting the recording operation, the current value of the erase current Ie1 that is feedback controlled, and the predetermined ratio $\epsilon$.

However, data is recorded by one recording operation in DVD-RW or DVD+RW. Therefore, if the data length is long, element temperature of the semiconductor laser element during the recording operation may be raised so that the optical output characteristic of the semiconductor laser element to the electric drive power (particularly to the drive current Iop) may change. In this case, because the optical output of the semiconductor laser element varies during the recording operation, the recording operation may not be performed appropriately, so that the recording process may not be continued, or data recorded in the recording operation may not be read out.

For instance, in FIG. 6, if the element temperature is raised during the recording operation so that the optical output characteristic of the semiconductor laser element changes from L1 to L2, the current value of the bottom current Iread necessary for optical output of the laser beam with the bottom power Pb changes. In this case, the erase power Pe is not changed because it is feedback controlled in accordance with the optical output of the laser beam, the erase current Ie necessary for optical output with the erase power Pe changes from Ie1 to Ie2. Therefore, the current value changes by $\Delta$Ie based on the characteristic curve L2. On the other hand, the peak current I also changes from Iw1 to Iw2, but the current value of the peak current Iw is set to a vale after changing by ($\epsilon$·$\Delta$Ie) in accordance with the variation $\Delta$Ie of the current value of the erase current Ie. Therefore, the optical output of the semiconductor laser element (light emission power) changes from the peak power Pw by $\Delta$P.

In contrast, in JP-A-2009-245487, the ratio $\epsilon$ is corrected based on a sensitivity coefficient indicating a relationship between a monitor value of the laser beam emitted from the semiconductor laser element and the electric drive power, so that the variation of the electric drive power is suppressed. In addition, in JP-A-2004-342271, an average value of the light emission power of the semiconductor laser element is determined, which is sample-held during a light emission period with the current value of the erase current. Then, using the determined average value and the current value of the erase current, the current value of the peak current for obtaining the peak power for recording data is determined from a ratio between a current value and a light emission power of the semiconductor laser element. In addition, in JP-A-2004-326841, amplitude of a pulse waveform of a control signal changing between a current value at the bottom power and a current value at the erase power is measured in states where the semiconductor laser element is driven to emit light with the bottom power and with the erase power. Then, the current value of the peak current is determined based on the current value of the erase current determined from the amplitude and the value $\epsilon$ determined from a recording speed. In addition, in JP-A-2009-87399, an ideal current value of the erase current is determined from an erasing ratio when the current value of the erase current is changed. Then, the current value of the peak current is determined from the ideal current value of the erase current and the ratio $\epsilon$. In addition, in JP-A-2004-199839, a variation of the current value of the erase current is added to or subtracted from the current value of the peak current so that the current value of the peak current is maintained to be constant. However, in JP-A-2009-245487, JP-A-2004-342271, JP-A-2004-326841, and JP-A-2009-87399, it is necessary to monitor a light emission power of the laser beam, an erasing ratio of DC erasing, a pulse waveform of the control signal, so as to perform the feedback control. In addition, in JP-A-2004-199839, an adding circuit or a subtracting circuit is necessary. Therefore, there is a problem that the device structure becomes complicated, and manufacturing cost is increased.

SUMMARY OF THE INVENTION

The present invention is created in view of the above-mentioned problem, and an object thereof is to provide an optical disc recording device and an optical disc recording method in which a variation of an optical output of the semiconductor laser element can be suppressed during a recording operation of data in DVD-RW or DVD+RW.

In order to achieve the above-mentioned object, an optical disc recording device according to an embodiment of the present invention includes an optical pick-up portion that includes a semiconductor laser element and records data in an optical disc recording medium, a storage portion that stores maximum length information in which a maximum data length of data recorded in one of DVD-RW and DVD+RW in one recording operation is set in advance, a decision circuit portion that decides whether or not the optical disc recording medium is one of DVD-RW and DVD+RW, a data split circuit portion that splits data to be recorded in the optical disc recording medium into split data having a data length of the maximum data length or smaller set in the maximum length information if it is decided that the optical disc recording medium is one of DVD-RW and DVD+RW, and an electric drive power setting circuit portion that resets an electric power value of an base electric power for controlling the semiconductor laser element to emit a laser beam with a bottom power every recording operation of the split data.

With the structure described above, when data is recorded in one of DVD-RW and DVD+RW as the optical disc recording medium, data to be recorded is split into split data having a data length of the maximum data length or smaller set in the maximum length information. Then, the electric power value of the base electric power for controlling the semiconductor laser element to emit light with the bottom power is reset every recording operation of the split data. Therefore, even if the data length of data to be recorded in one of DVD-RW and DVD+RW is so long that element temperature of the semiconductor laser element rises during the recording operation, the electric power value of the base electric power is reset during the recording process of data. Therefore, the electric drive power supplied to the semiconductor laser element is not shifted. Therefore, a variation of the optical output of the semiconductor laser element during a recording operation of data in DVD-RW or DVD+RW can be suppressed.

The optical disc recording device described above may further include a drive control circuit portion that controls an optical output of the semiconductor laser element, and the drive control circuit portion may supply to the semiconductor laser element a base current of a current value corresponding to the electric power value of the base electric power reset by the electric drive power setting circuit portion every recording operation of the split data.

In the optical disc recording device described above, an electric power value of a peak electric power for controlling the semiconductor laser element to emit a laser beam with a peak power may be set so that a ratio of a difference between the electric power value of the peak electric power and the electric power value of the base electric power to a difference between an electric power value of an erase electric power for controlling the semiconductor laser element to emit a laser beam with an erase power and the electric power value of the base electric power becomes a predetermined ratio.

In addition, an optical disc recording method according to an embodiment of the present invention includes the steps of determining whether or not the optical disc recording medium is one of DVD-RW and DVD+RW, reading maximum length information from a storage portion if it is decided that the optical disc recording medium is one of DVD-RW and DVD+RW, the maximum length information containing a maximum data length of data recorded in the optical disc recording medium by an optical pick-up portion in one recording operation, which is set in advance, splitting data to be recorded in the optical disc recording medium into split data having a data length of the maximum data length or smaller set in the maximum length information, if it is decided that the optical disc recording medium is one of DVD-RW and DVD+RW, and resetting an electric power value of an base electric power for controlling the semiconductor laser element of the optical pick-up portion to emit a laser beam with a bottom power every recording operation of the split data.

With the structure described above, when data is recorded in one of DVD-RW and DVD+RW as the optical disc recording medium, data to be recorded is split into split data having a data length of the maximum data length or smaller set in the maximum length information. Then, the electric power value of the base electric power for controlling the semiconductor laser element to emit light with the bottom power is reset every recording operation of the split data. Therefore, even if the data length of data to be recorded in one of DVD-RW and DVD+RW is so long that element temperature of the semiconductor laser element rises during the recording operation, the electric power value of the base electric power is reset during the recording process of data. Therefore, the electric drive power supplied to the semiconductor laser element is not shifted. Therefore, a variation of the optical output of the semiconductor laser element during a recording operation of data in DVD-RW or DVD+RW can be suppressed.

DETAILED DESCRIPTION OF THE PREFERRED EMBODIMENTS

Hereinafter, an embodiment of the present invention is described with reference to the attached drawings.

First, an optical disc recording device 1 according to this embodiment is described. The optical disc recording device 1 is a DVD player or a BD player, for example. The optical disc recording device 1 performs data writing (recording) and reading on an attachable and detachable optical disc 2 (optical disc recording medium) such as a digital versatile disc (DVD), for example. This optical disc 2 may be at least a DVD-RW or a DVD+RW. Other than that, the optical disc 2 may be, for example, a Blu-ray disc (BD) or an optical disc recording medium such as a DVD except a DVD-RW and a DVD+RW, or a compact disc (CD), which are not limitations.

Figure 1:
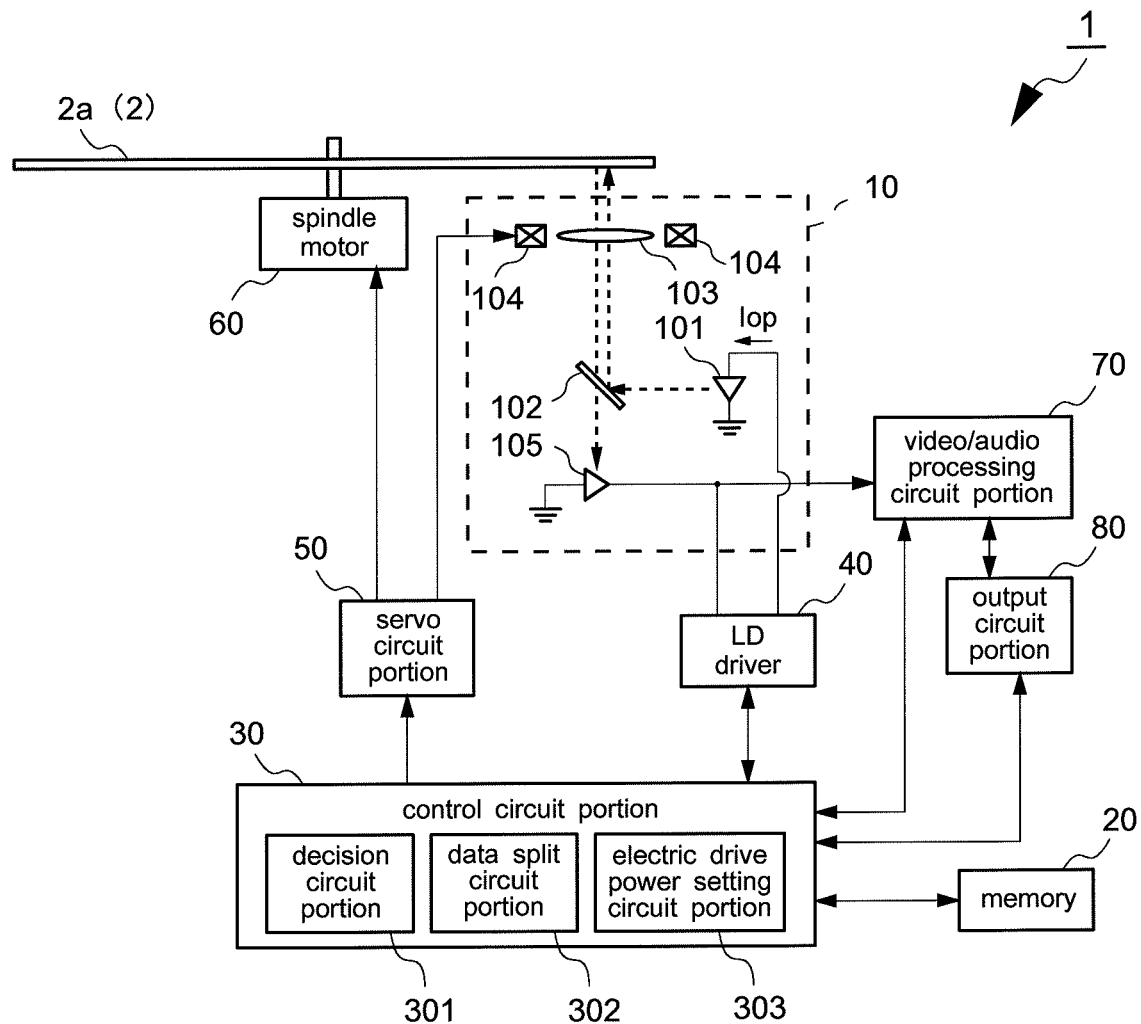
FIG. 1 is a block diagram of an optical disc recording device according to this embodiment.

FIG. 1 is a block diagram of the optical disc recording device according to this embodiment. The optical disc recording device 1 includes an optical pick-up portion 10, a memory 20 (storage portion), a control circuit portion 30, an LD driver 40 (drive control circuit portion), a servo circuit portion 50, a spindle motor 60, a video/audio processing circuit portion 70, and an output circuit portion 80. In addition to these, the optical disc recording device 1 may include a storage device such as a hard disk drive (HDD).

The optical pick-up portion 10 performs data writing (recording) and reading on the optical disc 2 mounted in the optical disc recording device 1. The optical pick-up portion 10 includes a laser diode 101 (semiconductor laser element), a beam splitter 102, an objective lens 103, an actuator 104, and a photodiode 105. Note that in the following description, the laser diode is referred to as an LD, and the photodiode is referred to as a PD.

Figure 2:
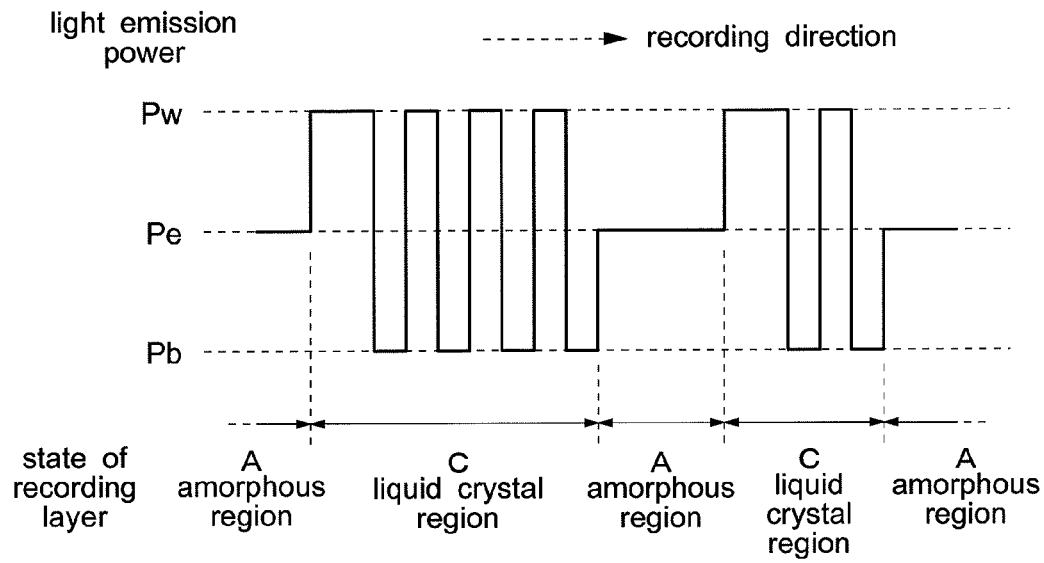
FIG. 2 is a diagram illustrating an example of an optical output waveform output from a laser diode when data is recorded in one of DVD-RW and DVD+RW.

The LD 101 emits a laser beam having intensity corresponding to an electric drive power supplied from the LD driver 40. For instance, if the optical disc 2 is one of DVD-RW and DVD+RW, when data is recorded, the LD 101 outputs multi pulse light constituted of three light emission powers (namely, a bottom power Pb, an erase power Pe, and a peak power Pw). FIG. 2 is a diagram illustrating an example of an optical output waveform output from the laser diode when data is recorded in a DVD-RW or a DVD+RW. In a recording layer of the optical disc 2, a region C irradiated by a laser beam having a multi pulse optical output constituted of the bottom power Pb and the peak power Pw is changed to a liquid crystal state. In addition, a region A irradiated by a laser beam having an optical output of the erase power Pe is changed to an amorphous state. In the DVD-RW or DVD+RW as the optical disc 2, the liquid crystal region C and the amorphous region A are formed in a predetermined combination so that data is recorded. Note that a fixed rated voltage is applied to the LD 101. Therefore, in reality, the optical output of the laser beam from the LD 101 is controlled by the drive current Iop supplied from the LD driver 40.

The beam splitter 102 guides the laser beam emitted from the LD 101 to a recording surface of the optical disc 2 mounted in the optical disc recording device 1. In addition, the beam splitter 102 guides a laser beam reflected by the recording surface of the optical disc 2 (hereinafter referred to as reflection light) to the PD 105.

The objective lens 103 condenses the laser beam entering the recording surface of the optical disc 2 so as to form a light spot of the laser beam on the recording surface of the optical disc 2.

The actuator 104 drives the objective lens 103 in a focusing direction (perpendicular to the surface of the optical disc 2) and in a tracking direction (radial direction of the optical disc 2) based on a control signal output from the servo circuit portion 50 so as to perform focus search and tracking adjustment.

The PD 105 performs photoelectric conversion of received reflection light so as to generate a current signal having an amplitude corresponding to intensity of the reflection light. Note that the current signal generated in the PD 105 may be converted by a predetermined conversion circuit into a voltage signal corresponding to an amplitude of the current signal. In any case, the optical pick-up portion 10 generates a photoelectric conversion signal corresponding to intensity of the reflection light (current signal or voltage signal). In addition, this photoelectric conversion signal includes not only recording data or read data of the optical disc 2 but also information of the optical output (light emission power) of the laser beam emitted from the LD 101 because intensity of the reflection light is reflected on the photoelectric conversion signal. Therefore, the optical disc recording device 1 uses this photoelectric conversion signal also as a control signal for feedback control of the optical output of the laser beam emitted from the LD 101. Therefore, the photoelectric conversion signal output from the PD 105 is supplied to the LD driver 40 and the video/audio processing circuit portion 70.

The memory 20 is a nonvolatile storage medium, which stores control information and a program used by the control circuit portion 30. This control information includes the maximum length information, an optical output data table, and the like. Note that in the maximum length information, there is set in advance the maximum data length of data recorded in DVD-RW or DVD+RW in one recording operation by the optical pick-up portion 10. In addition, a type of the optical disc 2, a set value of the optical output of the laser beam of the LD 101, a set value of the electric drive power (applied voltage and drive current Iop) to be supplied to the LD 101, and a ratio ε used for calculating an electric power value of the peak electric power or a current value Iw of the peak current are associated with each other and are set in advance in the optical output data table. Other than that, the memory 20 stores contents data generated by the video/audio processing circuit portion 70, data to be input and output with respect to the output circuit portion 80, and the like.

The control circuit portion 30 uses the control information and the program stored in the memory 20 so as to control individual portions of the optical disc recording device 1. In addition, the control circuit portion 30 includes a decision circuit portion 301, a data split circuit portion 302, and an electric drive power setting circuit portion 303.

The decision circuit portion 301 decides a type of the optical disc 2 mounted in the optical disc recording device 1 based on physical information read out by the optical pick-up portion 10 from an internal region of the optical disc 2 (for example, a read-in region of a DVD).

The data split circuit portion 302 set the maximum data length of data recorded in the optical disc 2 in one operation. Further, the data split circuit portion 302 splits the data to be record in the optical disc 2 in accordance with the set maximum data length, and performs the recording operation of each generated split data in the optical disc 2. For instance, if it is decided that the optical disc 2 is one of DVD-RW and DVD+RW, the data split circuit portion 302 splits the data to be recorded by the optical pick-up portion 10 in the optical disc 2 into the split data having a data length of the maximum data length or smaller set in the maximum length information stored in the memory 20.

The electric drive power setting circuit portion 303 sets the electric power value of the electric drive power to be supplied to the LD 101 by the LD driver 40 in accordance with the type of the optical disc 2. Then, the electric drive power setting circuit portion 303 outputs to the LD driver 40 a light emission control signal for controlling the optical output of the LD 101 in accordance with the set electric power value of the electric drive power and for controlling on and off of light emission of the LD 101 (namely, whether or not to supply the electric drive power to the LD 101). For instance, when data is recorded in a DVD-RW or a DVD+RW as the optical disc 2, the electric drive power setting circuit portion 303 sets a bottom electric power (base electric power) value for driving the LD 101 to emit light with an optical output of the bottom power Pb, an electric power value of the erase electric power for driving the LD 101 to emit light with an optical output of the erase power Pe, and an electric power value of the peak electric power for driving the LD 101 to emit light with an optical output of the peak power Pw based on an optical characteristic data table stored in the memory 20. In addition, the electric drive power setting circuit portion 303 outputs to the LD driver 40 the light emission control signal for controlling the optical output of the LD 101 in accordance with the electric power values of the electric drive powers, and for controlling on and off of light emission of the LD 101 (namely, whether or not to supply the electric drive power to the LD 101).

Note that in reality, because the fixed rated voltage is applied to the LD 101, the optical output of the LD 101 is controlled by the drive current Iop supplied to the LD 101. Therefore, the electric drive power setting circuit portion 303 sets a current value of the drive current Iop that the LD driver 40 supplies to the LD 101 in accordance with a type of the optical disc 2. For instance, if it is decided that the optical disc 2 is one of DVD-RW and DVD+RW, the electric drive power setting circuit portion 303 sets a current value of the bottom current Iread (base current), a current value of the erase current Ie, and a current value of the peak current Iw. Note that the bottom current Iread is drive current for driving the LD 101 to emit light with an optical output of the bottom power Pb. In addition, the erase current Ie is drive current for driving the LD 101 to emit light with an optical output of the erase power Pe. In addition, the peak current Iw is drive current for driving the LD 101 to emit light with an optical output of the peak power Pw. Further, the electric drive power setting circuit portion 303 outputs to the LD driver 40 the light emission control signal for controlling the optical output of the LD 101 in accordance with the current values Iread, Ie, and Iw, and for controlling on and off of light emission of the LD 101 (namely, whether or not to supply the electric drive power to the LD 101).

In addition, if it is decided that optical disc 2 is one of DVD-RW and DVD+RW, the electric drive power setting circuit portion 303 resets an electric power value of the bottom electric power (or the current value of the bottom current Iread) every recording operation of the split data. Note that a method of resetting the electric power value of the bottom electric power (or the current value of the bottom current Iread) is not limited in particular. For instance, it is possible to use a method including detecting element temperature of the LD 101 by a temperature sensor (not shown) and calculating an electric power value of the base electric power from the optical output data table for each element temperature stored in the memory 20, or a method including changing the electric power value of the base electric power little by little and determining an electric power value of the electric drive power when the LD 101 emits light.

The LD driver 40 controls on and off of light emission of the LD 101 based on the light emission control signal supplied from the electric drive power setting circuit portion 303. In addition, the LD driver 40 applies a fixed drive voltage to the LD 101. Then, the LD driver 40 controls the current value of the drive current Iop to be supplied to the LD 101 for performing the optical output control of the LD 101 as illustrated in FIG. 2. In addition, the LD driver 40 has an automatic power control (APC) function for feedback control of the optical output of the LD 101. The LD driver 40 performs feedback control of the current value of the drive current Iop to be supplied to the LD 101 based on the photoelectric conversion signal supplied from the PD 105 so that the optical output (light emission power) of the laser beam emitted from the LD 101 does not change.

The servo circuit portion 50 controls rotation speed of the spindle motor 60 and the actuator 104 of the optical pick-up portion 10 so as to control a write position on the recording surface of the optical disc 2 to record data or a read position.

The spindle motor 60 is a drive portion that rotates the optical disc 2 based on a control signal output from the servo circuit portion 50.

The video/audio processing circuit portion 70 performs various processes (such as a demodulation process) on the photoelectric conversion signal so as to generate various contents data (such as video data, audio data, and character data) based on the photoelectric conversion signal. Then, the video/audio processing circuit portion 70 outputs contents data to output circuit portion 80 as a video signal and an audio signal, for example. The output circuit portion 80 has an external connection terminal and is an interface for input and output of the video signal, the audio signal, and the control signal with respect to an external device.

Figure 3:
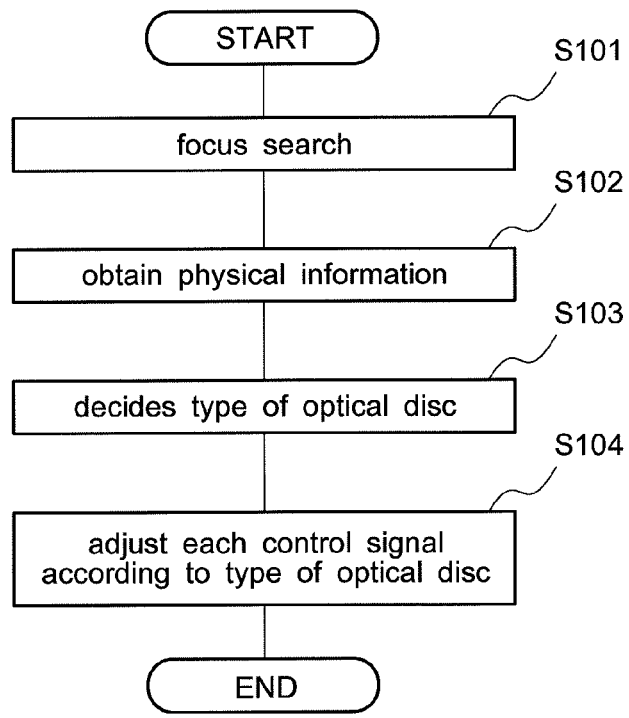
FIG. 3 is a flowchart for explaining an operation when an optical disc is mounted in the optical disc recording device according to this embodiment.

Next, an operation when the optical disc 2 is mounted in the optical disc recording device 1 is described. FIG. 3 is a flowchart for explaining the operation when the optical disc is mounted in the optical disc recording device according to this embodiment.

When the optical disc 2 is mounted in the optical disc recording device 1, the optical pick-up portion 10 performs focus search, tracking adjustment, and the like of the optical disc 2 (Step S101). Then, the optical pick-up portion 10 reads physical information from the internal region of the optical disc 2 (for example, the read-in region of a DVD) (Step S102). This physical information has information such as a type of the optical disc 2 and a writable sector length (data length) in the data region. Based on this physical information, the decision circuit portion 301 decides a type of the optical disc 2 (Step S103). The control circuit portion 30 performs adjustment of each control signal in accordance with a type of the optical disc 2 decided by the decision circuit portion 301 (Step S104).

Figure 4:
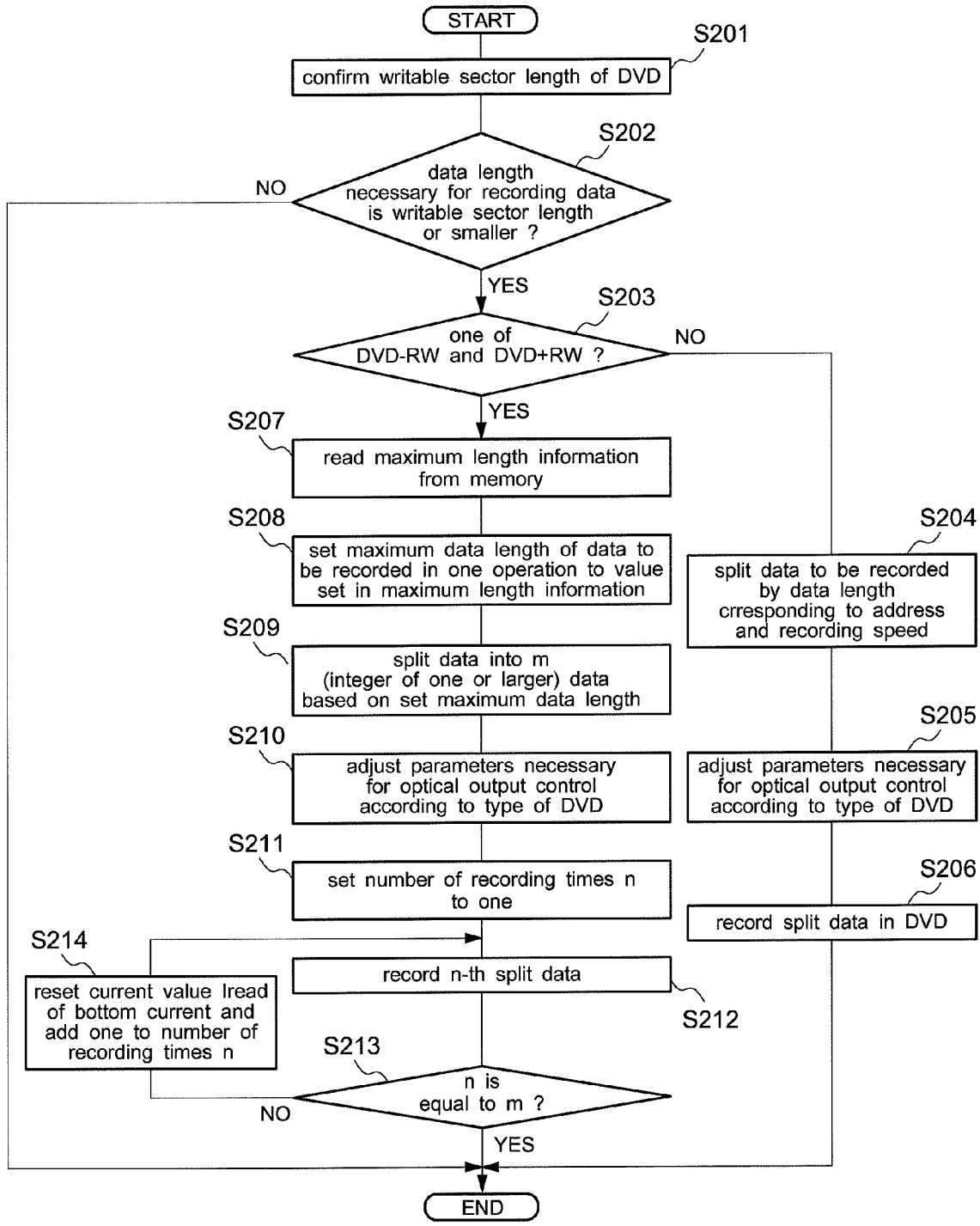
FIG. 4 is a flowchart for explaining an operation when the optical disc recording device according to this embodiment records data in a DVD.

Next, there is described an operation of recording data in a DVD 2a by the optical disc recording device 1 when it is decided that the optical disc 2 is the DVD 2a. FIG. 4 is a flowchart for explaining the operation when the optical disc recording device according to this embodiment records data in the DVD.

First, the control circuit portion 30 refers to physical information read from the read-in region of the DVD 2a so as to confirm the writable sector length (data length) in the data region of the DVD 2a (Step S201). The control circuit portion 30 decides whether or not a data length necessary for recording data in the DVD 2a is the writable sector length in the DVD 2a or smaller (Step S202). If the data length necessary for recording data is larger than the writable sector length (NO in Step S202), the control circuit portion 30 finishes the recording process.

In addition, if the data length necessary for recording data is the writable sector length or smaller (YES in Step S202), the decision circuit portion 301 decides whether or not the DVD 2a is one of DVD-RW and DVD+RW (Step S203).

If the DVD 2a mounted in the optical disc recording device 1 is not one of DVD-RW and DVD+RW (NO in Step S203), the data split circuit portion 302 splits the data to be recorded in the DVD 2a by the data length (for example, 1000 (h)) corresponding to an address in the data region of the DVD 2a in which the data is recorded and a recording speed (Step S204). Next, the electric drive power setting circuit portion 303 refers to the optical output data table stored in the memory 20 and sets parameters necessary for optical output control of the LD 101 (such as the electric power value of the electric drive power of the LD 101 in the recording operation and the current value of the drive current Iop) based on a type of the DVD 2a decided by the decision circuit portion 301 (for example, a DVD-R or a DVD-ROM) (Step S205). Then, the optical pick-up portion 10 records each split data in the DVD 2a (Step S206), and the process is finished.

On the other hand, if the DVD 2a mounted in the optical disc recording device 1 is one of DVD-RW and DVD+RW (YES in Step S203), the data split circuit portion 302 reads the maximum length information from the memory 20 (Step S207). Then, the data split circuit portion 302 sets the maximum data length of data to be record by the optical pick-up portion 10 in one operation to a value set in the maximum length information (for example, 10000 (h)) (Step S208). Further, the data split circuit portion 302 splits the data to be recorded in the DVD 2a into split data having a data length of the maximum data length or smaller so that m split data (m is an integer of one or larger) are generated (Step S209). In this case, the data split circuit portion 302 splits the data to be recorded in the DVD 2a so that the data length of each split data does not exceeds the maximum data length. In other words, the data length of each split data is the maximum data length or smaller set in Step S208.

Next, the electric drive power setting circuit portion 303 refers to the optical output data table stored in the memory 20 and sets parameters necessary for optical output control of the LD 101 (such as the electric power value of the electric drive power of the LD 101 in the recording operation and the current value of the drive current Iop) in accordance with a type of the DVD 2a decided by the decision circuit portion 301 (DVD-RW or DVD+RW). In addition, the electric drive power setting circuit portion 303 outputs an initial light emission control signal to the LD driver 40 (Step S210). For instance, the electric drive power setting circuit portion 303 refers to the optical output data table and sets the current value of the bottom current Iread (base current), the current value of the erase current Ie, and the current value of the peak current Iw. Then, the electric drive power setting circuit portion 303 outputs to the LD driver 40 the initial light emission control signal for controlling the optical output of the LD 101 in accordance with these current values Iread, Ie, and Iw and for controlling the LD 101 to emit light. Note that the current value of the bottom current Iread when the recording operation is started and the current value of the erase current value Ie are set in the optical characteristic data table stored in the memory 20, but the current value of the peak current Iw is set so that a ratio of a difference (Iw−Iread) between the current value of the peak current Iw and the current value of the bottom current Iread to a difference (Ie−Iread) between the current value of the erase current Ie and the current value of the bottom current Iread becomes a predetermined ratio $\epsilon$ ($\epsilon$>1). This ratio $\epsilon$ is set in the optical characteristic data table stored in the memory 20.

Next, the control circuit portion 30 sets the number of recording times n to one (Step S211). Then, the optical pick-up portion 10 records the n-th split data out of m split data in the data region of the DVD 2a (Step S212). In this case, the current value of the erase current Ie is feedback controlled by the LD driver 40 in accordance with the photoelectric conversion signal supplied from the PD 105. In addition, the LD driver 20 supplies the LD 101 with the latest current value of the bottom current Iread set by the electric drive power setting circuit portion 303, based on the light emission control signal supplied from the electric drive power setting circuit portion 303. In addition, the LD driver 20 controls the current value of the peak current Iw so that the current value of the peak current Iw becomes a current value corresponding to the latest current value of the bottom current Iread, the feedback controlled current value of the erase current Ie, and the ratio $\epsilon$ set in advance in the optical output data table.

When the recording operation of the n-th split data is finished, the control circuit portion 30 decides whether or not the number of recording times n is equal to m (Step S213). If the number of recording times n is equal to m (Yes in Step S213), the control circuit portion 30 finishes the process.

On the other hand, if the number of recording times n is not equal to m (No in Step S213), the electric drive power setting circuit portion 303 resets the current value of the bottom current Iread, the control circuit portion 30 adds one to the number of recording times n, and the process goes back to Step S212 (Step S214).

Figure 5:
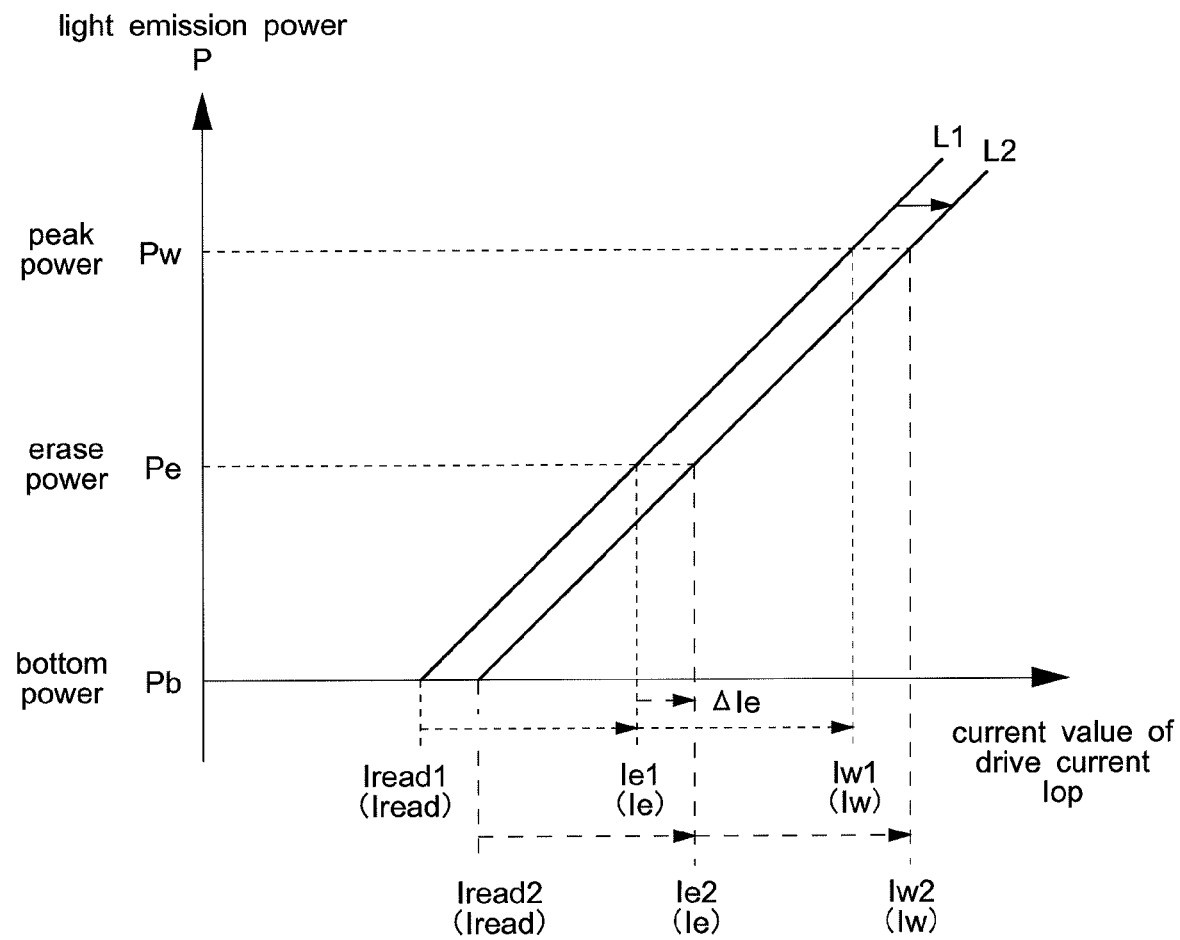
FIG. 5 is a graph illustrating optical output characteristic of the laser diode with respect to drive current in this embodiment.

As described above, when data is recorded in one of DVD-RW and DVD+RW as the optical disc 2, the data to be recorded is split into the split data having a data length of the maximum data length or smaller set in the maximum length information. Then, the current value of the bottom current Iread for controlling the LD 101 to emit light with the bottom power Pb is reset every recording operation of the split data. Therefore, even if the data length of data to be recorded in one of DVD-RW and DVD+RW as the optical disc 2 is so long that element temperature of the LD 101 rises during the recording operation, the current value of the bottom current Iread is reset during the recording process of data. Therefore, the current value of the peak current Iw supplied to the LD 101 can be set to an optimal value. FIG. 5 is a graph illustrating optical output characteristic of the laser diode with respect to a current value of the drive current in this embodiment.

In FIG. 5, if the element temperature rises so that the optical output characteristic of the LD 101 changes from L1 to L2 during the operation of recording data in a DVD-RW or a DVD+RW as the optical disc 2, the current value of the bottom current Iread necessary for optical output of the laser beam with the bottom power Pb changes. In this case, the erase power Pe is not changed because it is feedback controlled in accordance with the optical output of the laser beam. On the other hand, because the erase current Ie necessary for optical output with the erase power Pe is changed from Ie1 to Ie2 based on the characteristic curve L2, the current value of the erase current Ie is changed by $\Delta$Ie. In addition, because the peak current Iw is also changed from Iw1 to Iw2, the current value of the peak current Iw is set so that a ratio of a difference (Iw2−Iread2) between a current value of the changed peak current Iw2 and a current value of the latest bottom current Iread2 to a difference (Ie2−Iread2) between a current value of the feedback controlled erase current Ie2 and a current value of the latest reset bottom current Iread2 becomes a predetermined ratio $\epsilon$ ($\epsilon$>1) set in the optical output characteristic data table. Therefore, the peak power Pw is not changed. Therefore, it is possible to suppress a change of the optical output of the LD 101 during the operation of recording data in a DVD-RW or a DVD+RW as the optical disc 2.

The present invention is described above based on the embodiment. This embodiment is an example and can be modified variously as to the constituting elements and a combination of the processes, which are within the scope of the present invention as a skilled in the art can understand.

The present invention can be applied to a DVD recorder, a BD recorder, and the like, which can record data in at least a DVD-RW and a DVD+RW.

Figure 6:
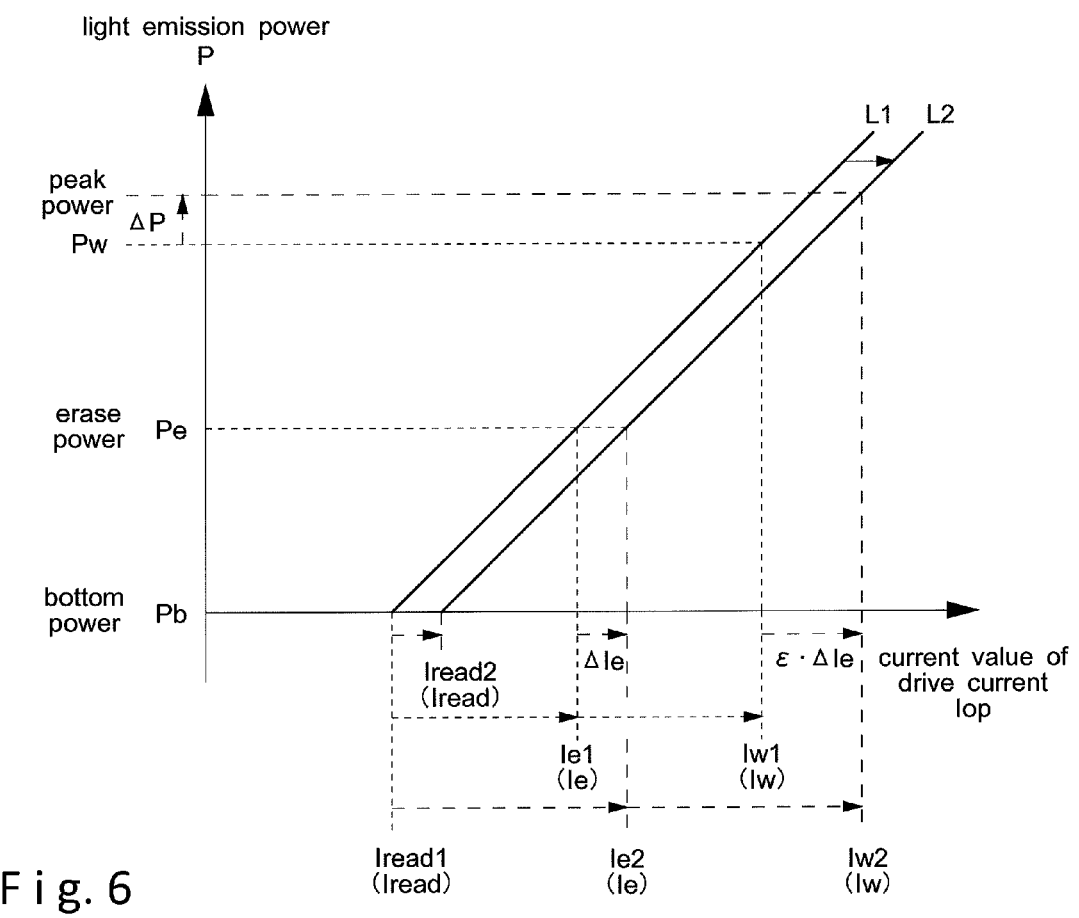
FIG. 6 is a graph illustrating optical output characteristic of the semiconductor laser element with respect to drive current in a conventional example.

FIG. 1
60 spindle motor
70 video/audio processing circuit portion
50 servo circuit portion
40 LD driver
80 output circuit portion
30 control circuit portion
301 decision circuit portion
302 data split circuit portion
303 electric drive power setting circuit portion
20 memory
FIG. 2
light emission power
recording direction
state of recording layer
A amorphous region
C liquid crystal region
FIG. 3
S101 focus search
S102 obtain physical information
S103 decides type of optical disc
S104 adjust each control signal according to type of optical disc
FIG. 4
S201 confirm writable sector length of DVD
S202 data length necessary for recording data is writable sector length or smaller?
S203 one of DVD-RW and DVD+RW?
S204 split data to be recorded by data length corresponding to address and recording speed
S205 adjust parameters necessary for optical output control according to type of DVD
S206 record split data in DVD
S207 read maximum length information from memory
S208 set maximum data length of data to be recorded in one operation to value set in maximum length information
S209 split data into m (integer of one or larger) data based on set maximum data length
S210 adjust parameters necessary for optical output control according to type of DVD
S211 set number of recording times n to one
S212 record n-th split data
S213 n is equal to m?
S214 reset current value Iread of bottom current and add one to number of recording times n
FIGS. 5, 6
light emission power
peak power Pw
erase power Pe
bottom power Pb
current value of drive current Iop

What is claimed is:

1. An optical disc recording device comprising:
a laser element;
a storage portion that stores maximum length information in which a maximum data length of data that the laser element can continuously record is set and optical output information in which an optical output characteristic of the laser element is set;
a data split portion that splits data to be recorded in an optical disc into split data having a data length of the maximum data length or smaller; and
an electric drive power setting portion that resets an base electric power value for controlling the laser element to emit a laser beam with a bottom power every time split data is recorded, wherein every time split data is recorded, the electric drive power setting portion sets a peak electric power value for controlling the laser beam to be outputted at a peak power based on the optical output information,
the peak electric power value is set such that a ratio of a difference between the peak electric power value and the base electric power value to a difference between an erase electric power value for controlling the laser beam to be outputted at an erase power during a recording operation and the base electric power value is a predetermined ratio,
the peak electric power value is larger than the erase electric power value, and the erase electric power value is larger than the base electric power value, and
the electric drive power setting portion sets the peak electric power value for controlling the laser beam to be outputted only at the peak power throughout a period in which recording pulses are outputted.

2. The optical disc recording device according to claim 1, further comprising a drive control portion that controls an optical output of the laser element,
wherein the drive control portion supplies to the laser element a base current value corresponding to the base electric power value reset by the electric drive power setting portion every time split data is recorded.

3. An optical disc recording method comprising the steps of:
reading maximum length information from a storage portion, the maximum length information containing a maximum data length of data that a laser element can continuously record;
splitting data to be recorded in an optical disc into split data having a data length of the maximum data length or smaller;
resetting a base electric power value for controlling the laser element to emit a laser beam with a bottom power every time split data is recorded; and
setting, every time split data is recorded, a peak electric power value for controlling the laser beam to be outputted at a peak power based on optical output information containing an optical output characteristic of the laser element, wherein
in the step of setting the peak electric power value, the peak electric power value is set such that a ratio of a difference between the peak electric power value and the base electric power value to a difference between an erase electric power value for controlling the laser beam to be outputted at an erase power during a recording operation and the base electric power value is a predetermined ratio,
the peak electric power value is larger than the erase electric power value, and the erase electric power value is larger than the base electric power value, and
in the step of setting the peak electric power value, the peak electric power value for controlling the laser beam to be outputted only at the peak power is set throughout a period in which recording pulses are outputted.

4. The optical disc recording device according to claim 1, further comprising a temperature sensor that detects temperature of the laser element, wherein
the storage portion stores, for each different value of the temperature, information in which a drive current value of current to be supplied to the laser element is set, and every time split data is recorded, the electric drive power setting portion resets the base electric power value based on the temperature detected by the temperature sensor and the information.

* * * * *